United States Patent [19]

Kobayashi et al.

[11] Patent Number: 5,308,218

[45] Date of Patent: May 3, 1994

[54] TRANSPORTATION DEVICE HAVING AN AIR-FOIL BEARING

[75] Inventors: Hisami Kobayashi; Yoshinori Noguchi, both of Kamikodanaka, Japan

[73] Assignee: Fujitsu Limited, Kawasaki, Japan

[21] Appl. No.: 866,923

[22] Filed: Apr. 10, 1992

[30] Foreign Application Priority Data

Apr. 11, 1991 [JP] Japan .................................. 3-079140

[51] Int. Cl.$^5$ ............................................. B65G 25/02
[52] U.S. Cl. ..................................... 414/676; 180/125
[58] Field of Search ................ 414/676; 180/125, 116

[56] References Cited

U.S. PATENT DOCUMENTS

| | | | |
|---|---|---|---|
| 3,232,366 | 2/1966 | Cockerell | 414/676 X |
| 3,828,884 | 8/1974 | Burdick | |
| 4,417,639 | 11/1986 | Wegener | 180/125 |
| 4,440,253 | 4/1984 | Pernum | 180/125 X |
| 4,832,562 | 5/1989 | Johnson | 180/125 X |

FOREIGN PATENT DOCUMENTS

| | | |
|---|---|---|
| 2640 | 1/1981 | Japan . |
| 140922 | 6/1987 | Japan . |
| 2118912 | 11/1983 | United Kingdom . |
| 2121743 | 1/1984 | United Kingdom . |

Primary Examiner—Cheryl L. Gastineau

[57] ABSTRACT

A transportation device for transporting an object comprises a base body, a depression provided on a top surface of the base body, a lifting mechanism provided on the base body in correspondence to the depression and including a lift plate for supporting the object thereon and an air envelope unit supplied with compressed air for causing a dilatation in response thereto, the lift plate being connected to the air envelope unit such that the lift plate is lifted upward upon a supply of the compressed air, and an air foil bearing provided on the base body such that a top surface of the air foil bearing is located at a level above a bottom surface of the base body.

12 Claims, 7 Drawing Sheets

TRANSPORTATION DEVICE HAVING AN AIR-FOIL BEARING

BACKGROUND OF THE INVENTION

The present invention generally relates to manufacturing of products such as electronic apparatuses and more particularly to a device used for transporting products, half-products or raw materials in a factory or warehouse.

In the factories or warehouses, the transportation of materials such as products, half-products or raw materials is achieved usually by transportation vehicles such as a fork-lift truck. However, such a transportation vehicle is bulky and the use thereof in a closed environment causes various problems such as exhaust gas, need of ventilation, etc. Further, a license is often required for an operator to operate such vehicles.

The air-foil transportation device is a device used for transporting various materials such as products, half-products or raw materials by using an air-foil bearing. Typically, the device includes a base body on which an air-foil bearing unit is provided, wherein the base body is lifted from a floor by an air-foil that is formed by the air-foil bearing unit. The device is ideal for use in the closed environment such as factories and warehouses, as the device is driven by compressed air.

When using the air-foil transportation device in such a closed environment, particularly for lifting a body that is placed on a pallet, it is necessary to form the air-foil transportation device sufficiently small with respect to the vertical dimension such that the air-foil transportation device can move into a space that is formed under the pallet. Typically, the height of such a space is less than 100 mm. On the other hand, in order to lift the pallet together with the body of product thereon, it is necessary to provide a lifting mechanism such as a pantograph or hydraulic cylinder on the base body. However, such a lifting mechanism is bulky and makes it impossible to move the device into the space formed under the pallet.

SUMMARY OF THE INVENTION

Accordingly, it is a general object of the present invention to provide a novel and useful transportation device, wherein the foregoing problems are eliminated.

Another and more specific object of the present invention is to provide a transportation device that has an air-foil bearing and a lifting mechanism on a base body, wherein the vertical dimension of the device is substantially reduced.

Another object of the present invention is to provide a transportation device for transporting an object, comprising: a base body having a top surface and a bottom surface; a depression provided on said top surface of said base body; lifting means provided on said base body in correspondence to said depression for lifting said object, said lifting means comprising a lift plate for supporting said object thereon and air envelope means supplied with a compressed air for causing a dilatation in response thereto, said lift plate being connected to said air envelope means such that the lift plate is lifted upward upon a supply of the compressed air to said air envelope means; and air foil bearing means having a top surface and a bottom surface and provided on said base body such that said top surface of the air foil bearing means is located at a level above said bottom surface of said base body, said air foil bearing means being supplied with compressed air for discharging the same from said bottom surface to form an air-foil. According to the present invention, one can construct the transportation device small enough with respect to the vertical dimension such that the device can easily be moved into a space formed below a pallet on which a heavy object is placed. By using the air envelope for the lifting means, one can construct the vertical size of the air envelope be smaller than the depth of the depression. Thereby, the height of the top plate does not exceed the top surface of the base body when the air envelope is in a retracted state. By activating the air-foil bearing unit, a human operator can easily transport heavy objects without friction against the floor.

Other objects and further features of the present invention will become apparent from the following detailed description when read in conjunction with the attached drawings.

DETAILED DESCRIPTION OF THE PREFERRED EMBODIMENTS

Figure 1:
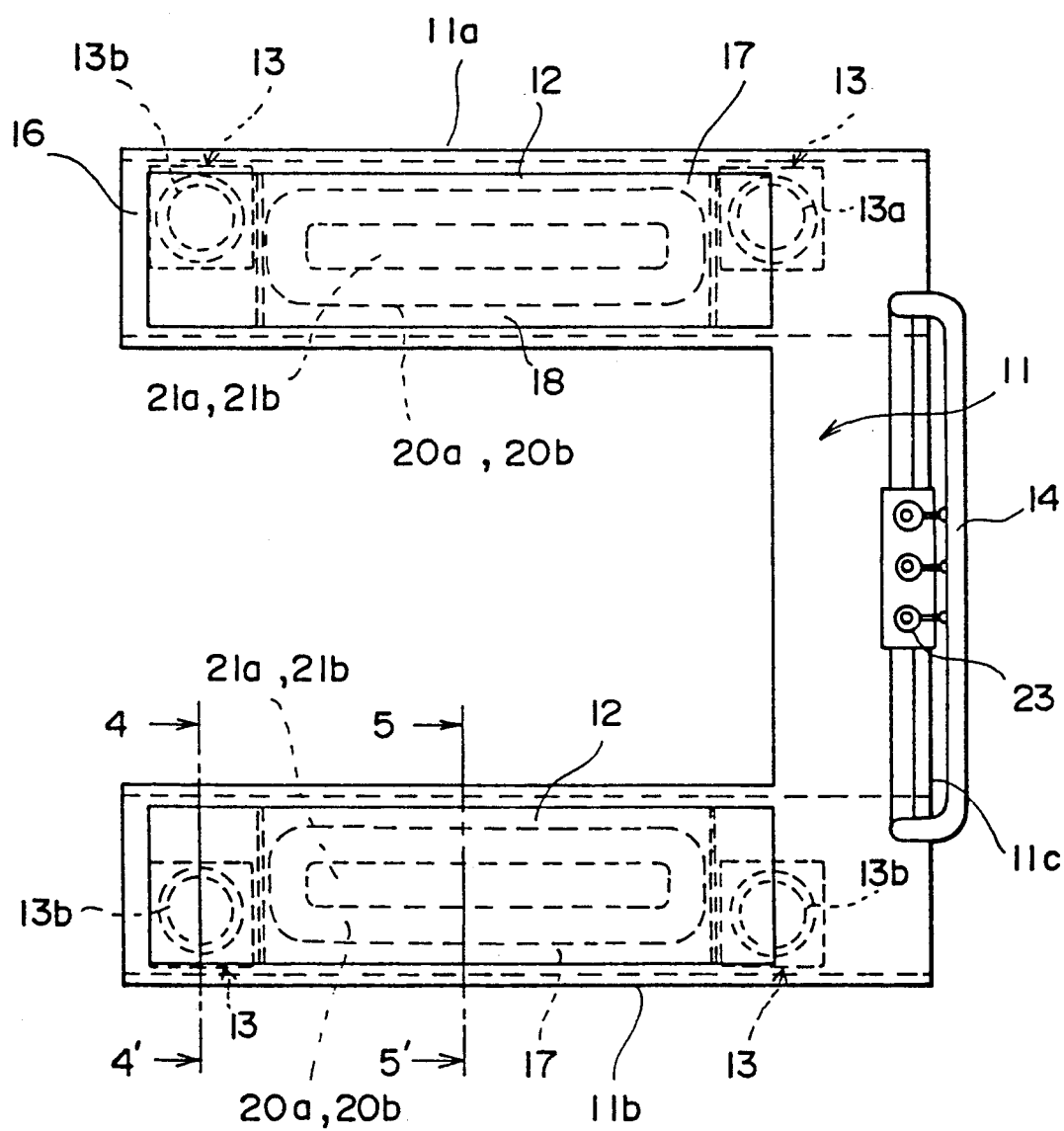
FIG. 1 is a diagram showing a transportation device according to a first embodiment of the present invention in a plan view.
Figure 2:
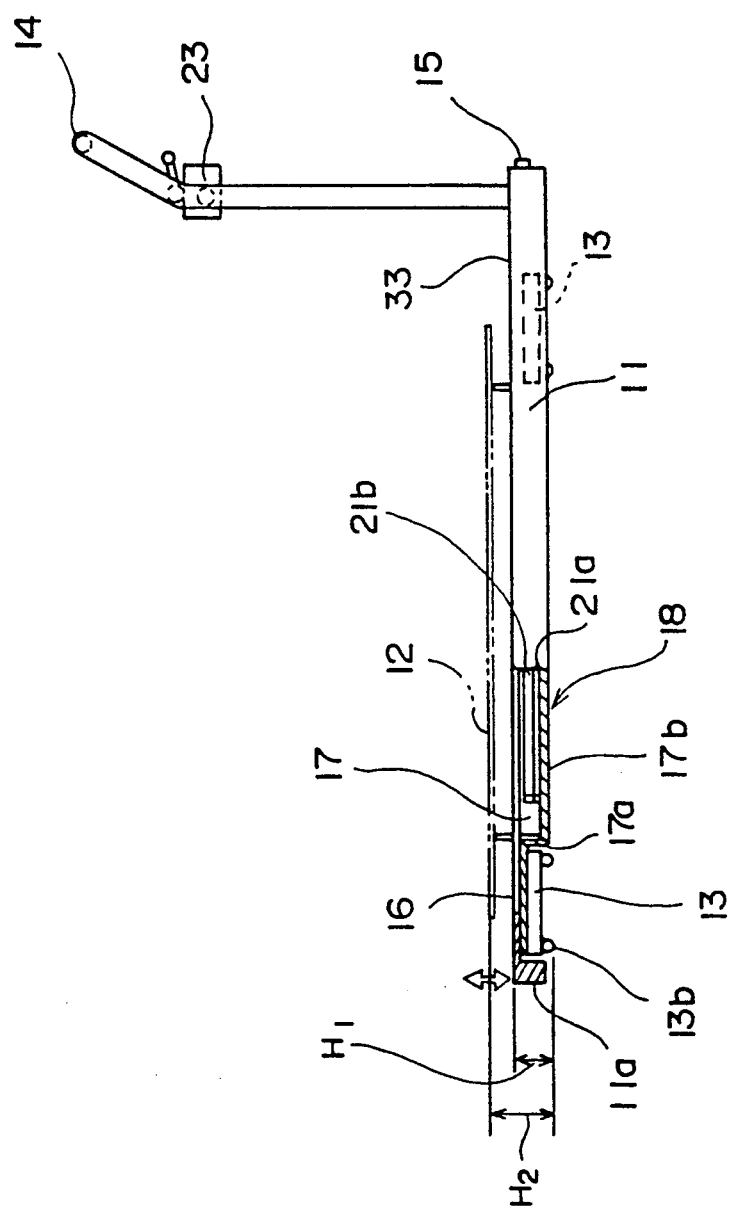
FIG. 2 is a diagram showing the device of FIG. 1 in a side view.
Figure 3:
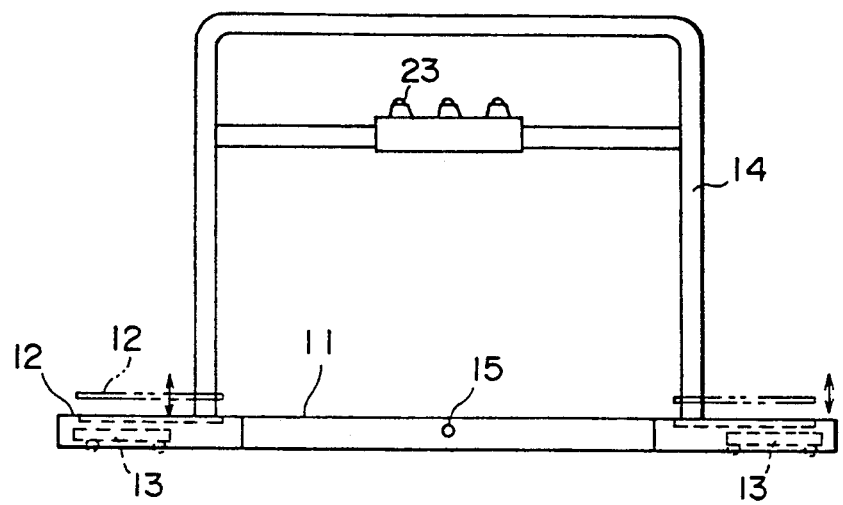
FIG. 3 is a diagram showing the device of FIG. 3 in a rear view.

FIG. 1 shows a transportation device according to a first embodiment of the present invention in a plan view, while FIG. 2 shows the same device in a side view. Further, FIG. 3 shows the device in a rear view. The device is used in a factory for assembling heavy electronic apparatuses and facilities such as transmission apparatuses and main-frame computers.

Referring to FIG. 1, the device includes a base body 11 having a U-shaped form. As shown in the side view of FIG. 2, the base body 11 includes, in each finger part 11a, 11b thereof, a depression part 17 that is defined by a side wall 17a and a bottom plate 17b. There, the side wall 17a surrounds a depression formed in the depression part 17 laterally, and there are provided a pair of lateral extensions 16 extending laterally from a top edge of the side wall 17a as indicated in FIG. 2. Further, the upper major surface of the lateral extension 16 is covered partially by a skirt member 11a as illustrated. Thereby, top surface of the skirt member 11a defines the top surface of the base body 11. On the other hand, the bottom surface of the base body 11 is given by the air-foil bearing unit to be described below.

Figure 4:
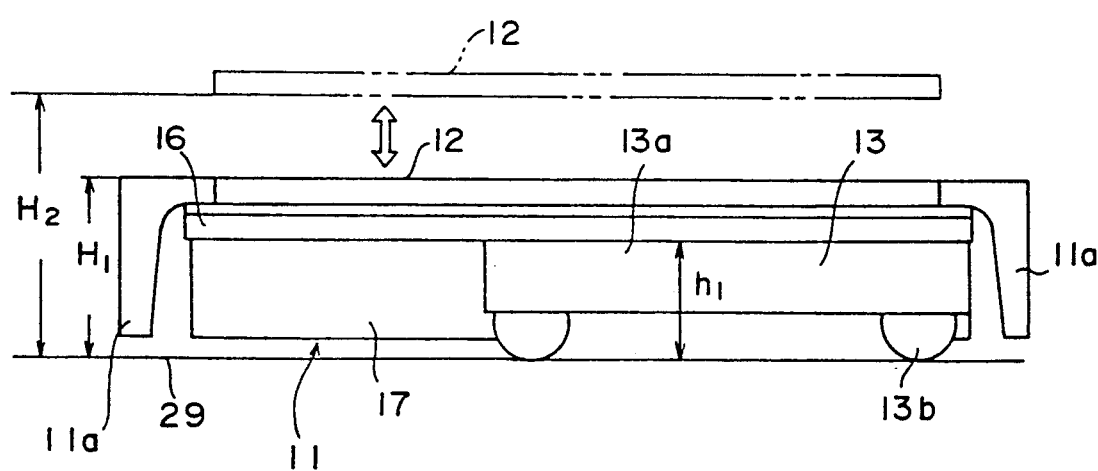
FIG. 4 is an enlarged cross sectional view of the device of FIG. 1 along a line 4-4'.

In response to the finger part of the base body 11, there is provided a movable lift plate 12 that covers the depression 17 when in a retracted position to be described. The lift plate 12 is actuated by air envelopes 21a and 21b that are supplied with compressed air and lift the plate 12 in the upward direction. In FIG. 4, the lift plate 12 is indicated in the retracted position by a continuous line, while the same plate 12 in a lifted position is indicated by a broken line. Thereby, the lift plate 12 forms, together with air envelopes 21a and 21b, a lift mechanism 18. In the retracted position, it should be noted that the top plate 12 forms a flush surface with the top surface of the skirt member 11a.

Further, the device of FIG. 1 includes an air bearing unit 13 provided in correspondence to the lateral extensions 16 generally at four corners of the transportation device. As shown in the cross sectional view of FIG. 2, the air bearing unit 13 is provided on the lower major surface of the part 16 and forms an air-foil between a floor (not shown) by discharging air into a pocket 13a that is formed on the bottom surface of the unit 13. The pocket 13a is opened in the downward direction and has a rim that is surrounded by a rubber ring 13b. There, the air discharged into the pocket 13a flows laterally over the rubber ring 13b and forms the desired air-foil. As a result of formation of the air-foil, the base body 11 is lifted from the floor by 2-3 mm. Thereby, a human operator can move the base body 11 without difficulty even when a heavy object such as a cabinet of transmission apparatus or main-frame computer is placed on the lift plate 12. It should be noted that the weight of such an apparatus amounts as much as 2-3 tons. It should be noted that the base body 11 has an overall height $H_1$ that is measured from the top surface of the skirt member 11a and hence the top surface of the lift plate 12 to the bottom of the rubber ring 13b.

In order to supply the compressed air to the air-foil bearing 13, a connector 15 is provided on the suitable location of the base body 11 for connection with a high pressure hose that supplies the compressed air. In the illustrated example, the connector 15 is provided at a central part of a connection member 11c that is provided at a rear part of the base body 11 for connecting the aforementioned finger parts 11a and 11b with each other. See the rear view of FIG. 3. The compressed air thus introduced is distributed to the air foil-bearing unit 13 and to the air envelopes 21a and 21b. Further, in correspondence to the member 11c, there is provided a handle 14 for the human operator to move the device. As shown in FIG. 3, there is provided a controller 23 for controlling the supply and distribution of the compressed air to the air-foil bearing units as well as to the envelopes.

FIG. 4 shows the cross section of the device of FIG. 1 taken along the line 4-4'.

Referring to FIG. 4, the overall height $H_1$ of the transportation device of the present invention is determined substantially by the overall thickness $h_1$ of the air-foil bearing unit 13, wherein the thickness $h_1$ is measured from the top surface of the unit 13 to the bottom of the rubber ring 13b. It should be noted that the air bearing unit 13 is mounted on the lower major surface of the lateral extension 16 that is covered by the skirt member 11a as already described. The contribution of the skirt member 11a and the lateral extension 16 on the overall height $H_1$ of the base body 11 is not significant as compared with the thickness $h_1$ of the air-foil bearing unit 13.

In the construction shown in FIG. 4, it should be noted that the top surface of the air-foil bearing unit 13 is located above the bottom surface of the depression part 17, while the bottom level of the air-foil bearing unit 13 is located below the bottom surface of the depression part 17. Further, the air envelopes 21a and 21b that form the essential part of the lift mechanism 18 is accommodated within the depression formed in the depression part 17. Thereby, the lift plate 12 assumes a level substantially flush with the top surface of the base body 11 as already mentioned. Thereby, one can reduce the overall height $H_1$ of the base body 11 such that the base body 11 can be moved into the narrow space formed under the pallet that carries thereon the object to be transported. Typically, the overall height $H_1$ is about 60 mm, while the thickness $h_1$ is about 40 mm. When the lift mechanism 18 is provided on the top surface of the base body 11, on the other hand, one cannot move the transportation device into the space under the pellet, as such a space generally has the height of 100 mm or less as mentioned previously.

Figure 5A:
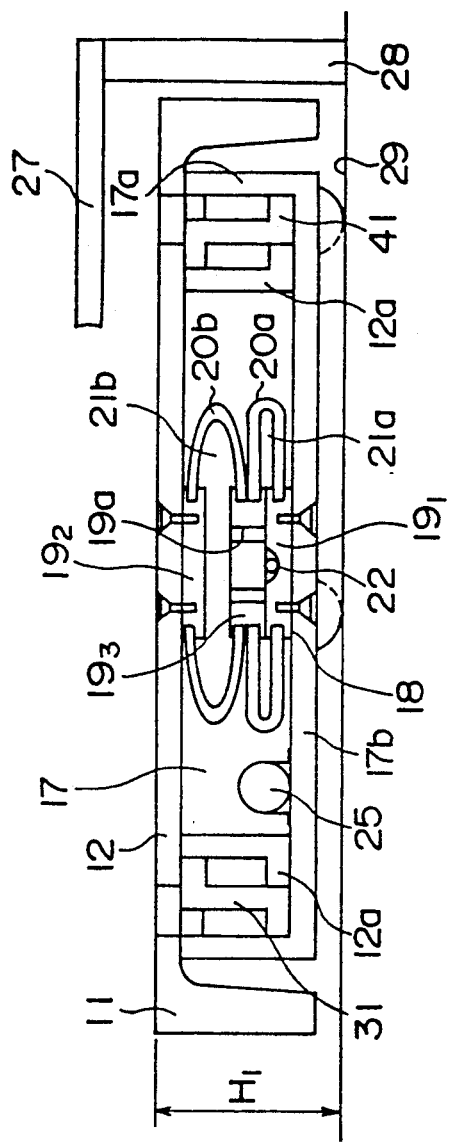
FIGS. 5A and 5B are enlarged cross-sectional views taken along line 5-5' of FIG. 1 and illustrating a lift mechanism of FIG. 1 in a retracted state and a lifted state, respectively.
Figure 5B:
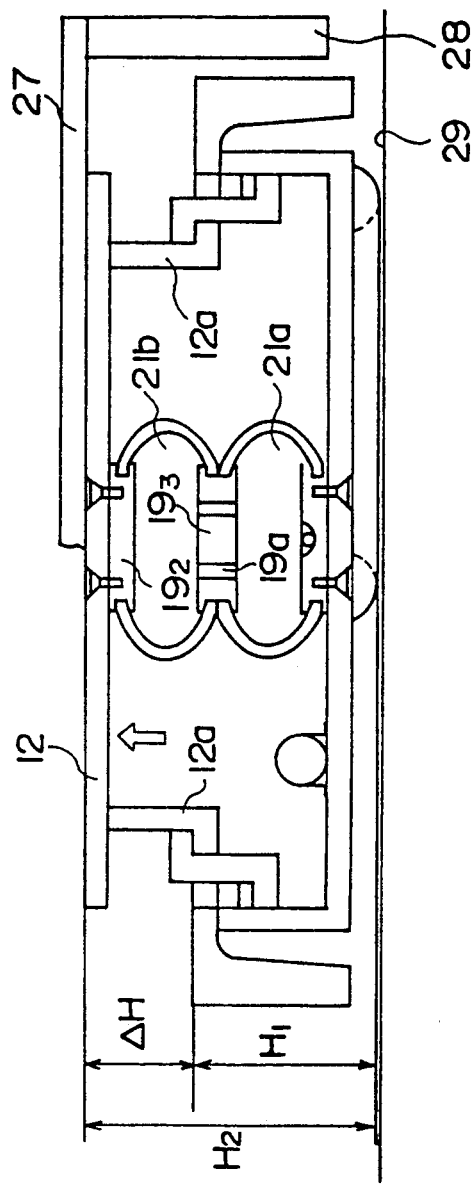

FIGS. 5(A) and 5(B) show the lift mechanism 18 in detail.

Referring to the drawings, the lift mechanism 18 includes a bottom plate $19_1$ connected to the bottom surface 17b of the depression part 17, an intermediate plate $19_3$ located above the bottom plate $19_1$, and a top plate $19_2$ located further above the bottom plate $19_3$, wherein a rubber membrane 20a that forms the air envelope 21a connects the bottom plate $19_1$ and the intermediate plate $19_3$ with each other. In the retracted state shown in FIG. 5(A), the intermediate plate $19_3$ and the bottom plate $19_1$ are contacted with each other. Further, there is provided a groove on the top surface of the plate $19_1$, and an air inlet tube 22 is provided in correspondence to the groove for introducing the compressed air into the air envelope 21a. Further, the intermediate plate $19_3$ is provided with a communication opening 19a for distributing the compressed air supplied to the air envelope 21a also to the air envelope 21b. It should be noted that it is essential to provide the air inlet tube 22 in the depression in order to reduce the height of the lift mechanism 18.

The lift plate 12 is connected to the top plate $19_2$, and the lift plate 12 is moved in the upward direction in response to the supply of the compressed air via the air inlet tube 22. In order to transport the compressed air to the air inlet tube 22, a high pressure hose 25 is provided on the bottom surface 17b to extend between the connector 15 and the air inlet tube 22.

In the retracted state shown in FIG. 5(A), the base body 11 is moved into the space formed under a pallet 27 that is supported on a floor 29 by a leg 28. It should be noted that the overall height $H_1$ of the base body is small enough that the base body 17 enters into the space without difficulty, even when the body 17 is lifted by 2-3 mm by the air-foil bearing.

In response to the supply of the compressed air, the lift plate 12 is moved upward as shown in FIG. 5(B). Thereby, the plate 12 is guided by guide members 31 and 12a that are provided along the side wall 17a of the depressed part 17, and is moved vertically. Thereby, the lift plate 12 is moved upward by a distance ΔH, and the pallet 27 is lifted upward together with the heavy object placed thereon as indicated in FIG. 5(B).

Figure 6:
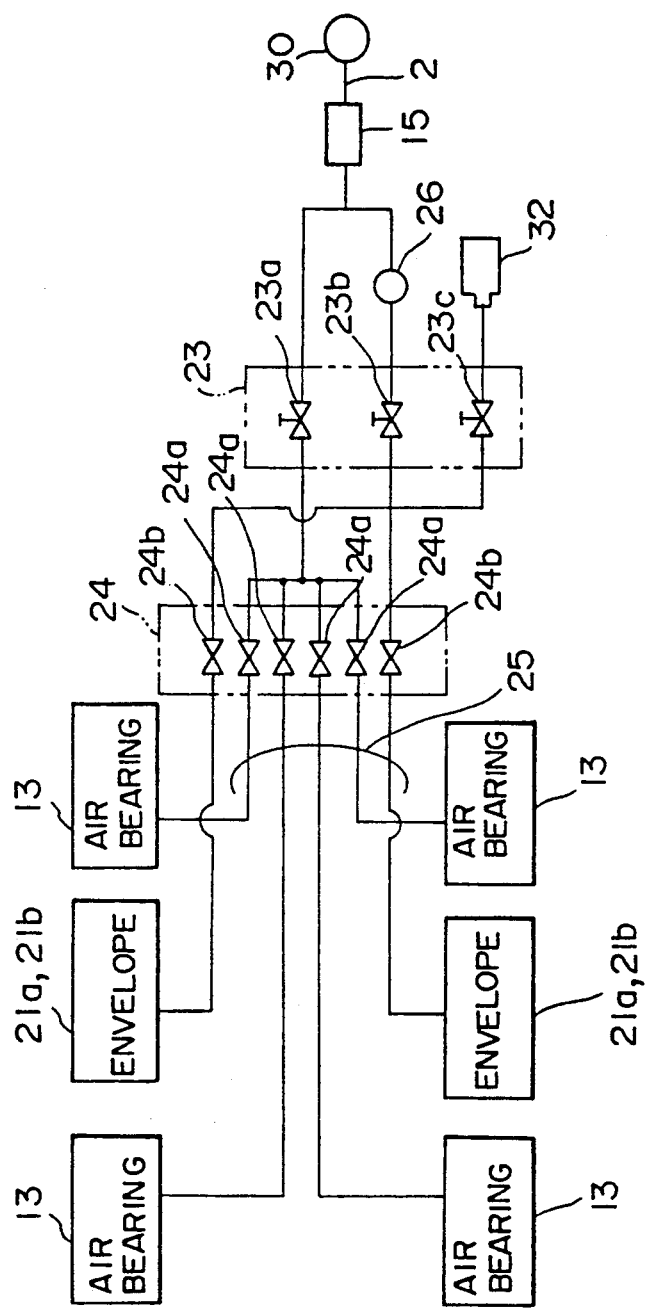
FIG. 6 is an air supply system that is used in the transportation device of FIG. 1.

FIG. 6 shows the air supply system that is used in the transportation device of the present invention.

Referring to FIG. 6, the air supply system includes an air pump 30 that produces the compressed air. The compressed air thus produced is supplied to the connector 15 and is distributed further to the four air-foil bearing units 13 as well as to the air-envelopes 21a, 21b as indicated. There, the compressed air for the air-foil bearing units 13 is controlled by a control valve 23a that forms an element of the valve unit 23 and is supplied selectively via a flowrate regulator 24a that forms a flowrate regulation unit 24. On the other hand, the compressed air to be supplied to the air envelopes 21a and 21b is supplied first to a pressure regulator 26 for pressure regulation. After being passed through the regulator 26, the compressed air is supplied to the air-foil bearing unit 13 via a control valve 23b and a flowrate regulator 24b. Further, in order to retract the lift mechanism 18, there is provided a discharge valve 23c that discharges the air in the air envelopes 21a, 21b via a muffler 23. In response to the discharge of the air, the lift mechanism 18 is retracted to the state shown in FIG. 5(A).

Next, the use of the transportation device of the present invention will be described with reference to FIG. 7 that shows the layout of a production line.

Figure 7:
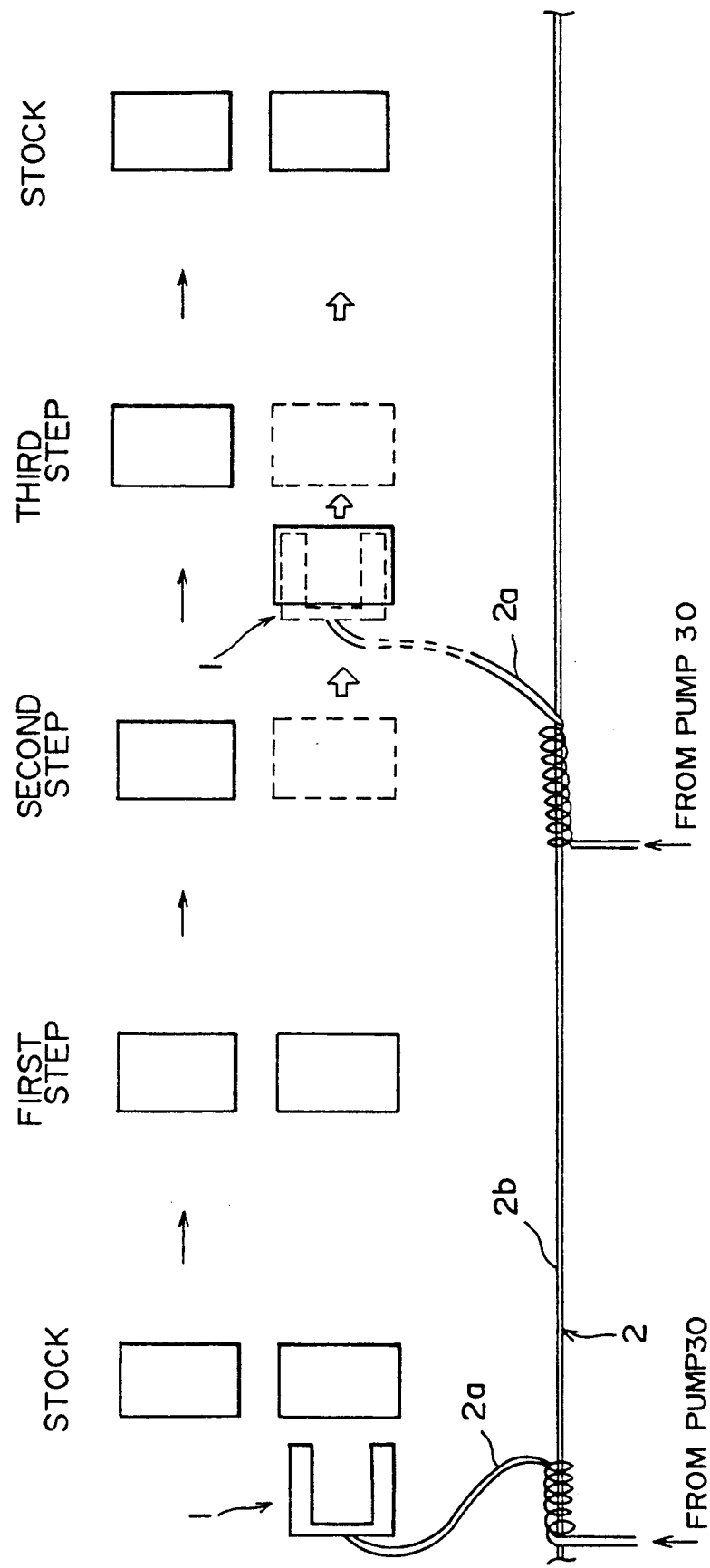
FIG. 7 is a diagram showing the layout of a factory wherein the transportation device of the present embodiment is used for transporting a product.

Referring to FIG. 7, there are a number of processing stations in the production line in correspondence to various processing steps, and the object such as a transmission apparatus or computer is transported from one station to the next station by the transportation device of FIG. 1. In FIG. 7, the transportation device is represented by a numeral 1.

Along the production line, an air supply system 2 is provided for supplying the compressed air produced by the pump 30 to the connector 15. The air supply system 2 includes a flexible high pressure hose 2a and a support wire 2b provided along a ceiling of the factory building. There, the support wire 2b supports the high pressure hose 2a thereon in the state that the hose 2a can extend and the transportation device 1 can move over the floor of the factory between various processing stations.

In operation, the operator actuates the valve 23a to activate the air-foil bearing unit 13. Thereby, the air-foil is formed under the base body 11 of the device and the device becomes movable without friction. Further, the operator activates the control valve 23c to discharge the air in the air envelopes 21a, 21b of the lift mechanism 18 such that the lift plate 12 is in the retracted position shown in FIG. 5(A). This step may be eliminated if the lift plate 12 is already in the retracted state.

Figure 8:
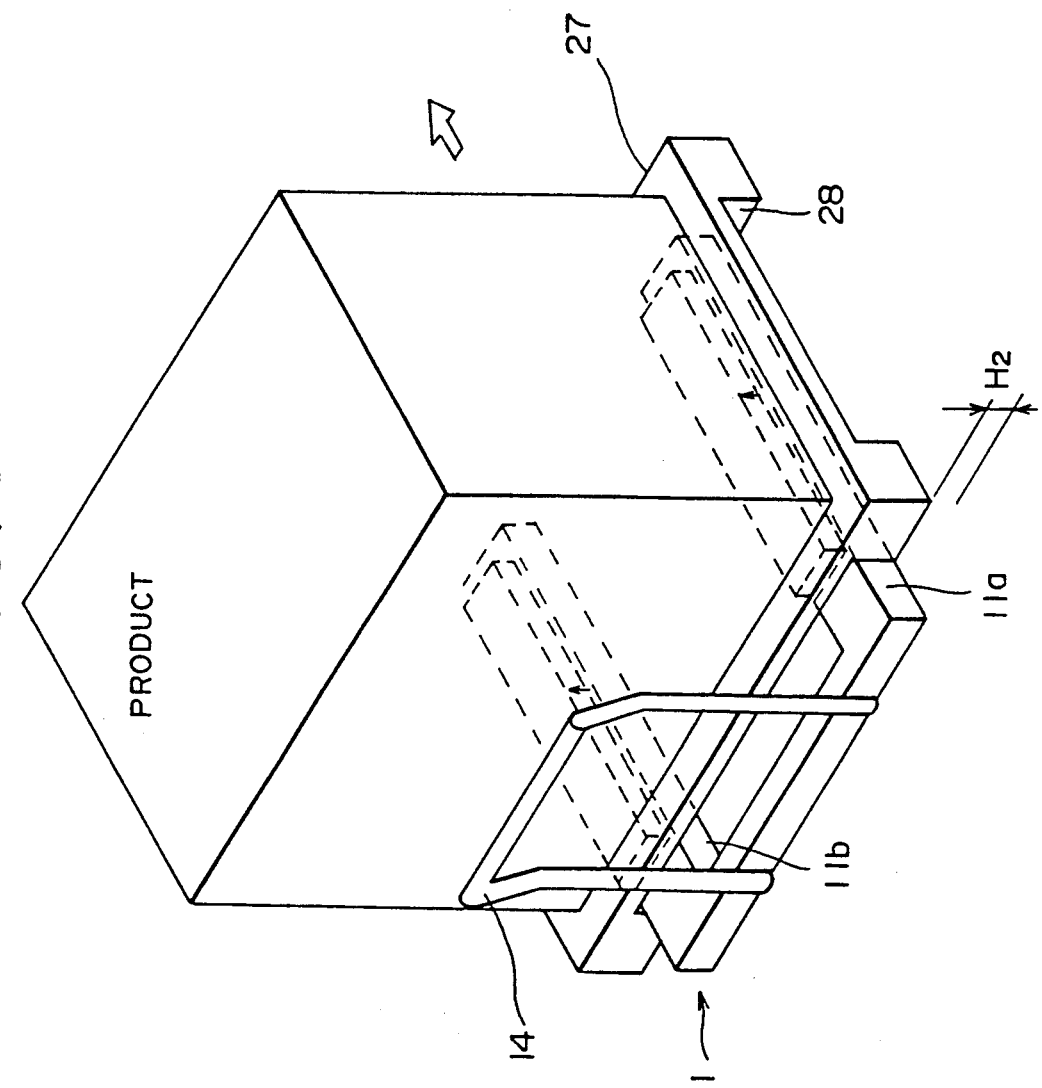
FIG. 8 is a diagram showing the lifting of an object by the transportation device of the present invention.

Next, the device 1 is moved such that the finger parts 11a, 11b of the base body 11 enters into the space formed under the pallet 27 as illustrated in FIG. 8. In this state, the operator actuates the valve 23b and the lift mechanism 18 is activated by the compressed air that is supplied via the air supply system 2. Thereby, the lift plate 12 is lifted to the state shown in FIG. 5(B), and the object placed on the pallet 27 is lifted altogether. In this state, the operator pushes the transportation device by holding the handle 14. As the air-foil bearing is formed under the base body 11, the operator can easily move the object from the stock station to the first processing station, from the first processing station to the next processing station, etc. without substantial physical effort, even when the weight of the object is in the order of several tons.

When the object is transported to the desired station, the operator actuates the control valve 23c to release the air inside the air envelopes 21a and 21b. Thereby, the lift plate 12 is lowered to the state shown in FIG. 5(A), and the leg 28 of the pallet 27 is landed on the floor 29. After this, the operator can easily haul the device out from the space under the pallet 27.

As the transportation device of the present invention can be made small with respect to the vertical dimension, one can use the device for the transportation of heavy objects that have very short legs.

Further, the present invention is not limited to the embodiments described heretofore, but various variations and modifications may be made without departing from the scope of the invention.

What is claimed is:

1. A transportation device for transporting an object, comprising:
    a base body having a top surface and a bottom surface;
    a depression provided in said top surface of said base body;
    lifting means provided on said base body in correspondence with said depression for lifting said object, said lifting means comprising a lift plate for supporting said object thereon and air envelope means supplied with compressed air for causing a dilatation in response thereto, said lift plate being connected to said air envelope means such that the lift plate is lifted upward upon a supply of compressed air to said air envelope means; and
    air foil bearing means having a top surface and a bottom surface and provided on said base body such that said top surface of the air foil bearing means is located at a level above said bottom surface of said base body, said air foil bearing means being supplied with compressed air for discharging the same from said bottom surface of said air foil bearing means to form an air-foil.

2. A transportation device as claimed in claim 1 in which said base body has a height measured from said bottom surface of the air foil bearing means to said top surface of the base body, wherein said height is set substantially smaller than 100 mm.

3. A transportation device as claimed in claim 2 in which said height is set to about 60 mm.

4. A transportation device as claimed in claim 1 in which said lift plate is located at a level substantially identical with the top surface of said base body when said air envelope means is not supplied with the compressed air.

5. A transportation device as claimed in claim 1 in which said base body comprises a side wall and a bottom plate that define said depression, said base body further comprising a lateral extension part extending laterally from a top edge of said side wall, said lateral extension part having a lower major surface, wherein said air-foil bearing means is provided on said lower major surface of the lateral extension part such that the top surface of the air-foil bearing means is connected to the lower major surface of the lateral extension part.

6. A transportation device as claimed in claim 1 in which said air-foil bearing means comprises a flexible ring in correspondence to the bottom surface of said air-foil bearing means, said flexible ring protruding in a downward direction beyond the bottom surface of said base body.

7. A transportation device as claimed in claim 1 in which said air envelope means comprises a bottom plate mounted at a bottom of said depression, an intermediate plate provided on said bottom plate, a top plate provided on said intermediate plate and connected to said lift plate, a first flexible envelope connecting said bottom plate and said intermediate plate, and a second flexible envelope connecting said intermediate plate and said top plate, said bottom plate and said intermediate plate being contacted with each other when said air envelope means is not supplied with the compressed air.

8. A transportation device as claimed in claim 7 in which said bottom plate of said air envelope means has a top surface in which a depression is formed, wherein said depression accommodates therein an inlet tube for introducing compressed air to said air envelope means.

9. A transportation device as claimed in claim 8 in which said intermediate plate is provided with a communication hole for passing the compressed air between said first envelope and said second envelope.

10. A transportation device as claimed in claim 5 in which said lifting means comprises a guide member provided along said side wall such that the lift plate is moved vertically in response to the supply of the compressed air to the air envelope means.

11. A method for producing an electronic apparatus in a production line, comprising the steps of:

moving a transportation device into a space formed below the electronic apparatus, said transportation device comprising: a base body having a top surface and a bottom surface; a depression provided on said top surface of said base body; lifting means provided on said base body in correspondence to said depression for lifting said electronic apparatus, said lifting means comprising a lift plate for supporting said electronic apparatus thereon and air envelope means supplied with compressed air for causing a dilatation in response thereto, said lift plate being connected to said air envelope means such that the lift plate is lifted upward upon a supply of the compressed air to said air envelope means; and air foil bearing means having a top surface and a bottom surface and provided on said base body such that said top surface of the air foil bearing means is located at a level above said bottom surface of said base body, said air foil bearing means being supplied with compressed air for discharging the same from said bottom surface to form an air-foil, said step of moving the transportation device comprising a step of activating said air-foil bearing means;

lifting said lift plate together with said electronic apparatus by supplying a compressed air to said air envelope means;

transporting said electronic apparatus from a first station of the production line to a second station of the production line;

discharging the compressed air supplied to said air envelope means to lower said lift plate together with the electronic apparatus; and removing said transporting device out from said space.

12. A production line for producing an electronic apparatus, comprising:

a floor defined with a plurality of processing stations for processing the electronic apparatus;

an air supply system provided above said floor along said plurality of processing stations for supplying compressed air;

a transportation device comprising: a base body having a top surface and a bottom surface; a depression provided on said top surface of said base body; lifting means provided on said base body in correspondence to said depression for lifting said electronic apparatus, said lifting means comprising a lift plate for supporting said electronic apparatus thereon and air envelope means supplied with a compressed air for causing a dilatation in response thereto, said lift plate being connected to said air envelope means such that the lift plate is lifted upward upon a supply of the compressed air to said air envelope means; and air foil bearing means having a top surface and a bottom surface and provided on said base body such that said top surface of the air foil bearing means is located at a level above said bottom surface of said base body, said air foil bearing means being supplied with a compressed air for discharging the same from said bottom surface to form an air-foil, said air supply system being connected to said air supply system for receiving the compressed air therefrom.

* * * * *